United States Patent
Diab et al.

(10) Patent No.: US 8,532,139 B2
(45) Date of Patent: *Sep. 10, 2013

(54) METHOD AND SYSTEM FOR INDICATING A TRANSITION IN RATE AND/OR POWER CONSUMPTION UTILIZING A DISTINCT PHYSICAL PATTERN ON ONE OR MORE IDLE CHANNEL(S)

(75) Inventors: Wael William Diab, San Francisco, CA (US); Howard Frazier, Pleasanton, CA (US); Scott Powell, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 12/235,410

(22) Filed: Sep. 22, 2008

(65) Prior Publication Data
US 2009/0154473 A1 Jun. 18, 2009

Related U.S. Application Data

(63) Continuation-in-part of application No. 11/859,429, filed on Sep. 21, 2007.

(60) Provisional application No. 61/094,639, filed on Sep. 5, 2008, provisional application No. 61/014,227, filed on Dec. 17, 2007.

(51) Int. Cl.
*H04J 3/16* (2006.01)

(52) U.S. Cl.
USPC .......................................... 370/468

(58) Field of Classification Search
USPC ............................... 370/437, 468
See application file for complete search history.

(56) References Cited

U.S. PATENT DOCUMENTS 6,591,303 B1 * 7/2003 Hendel et al. ................. 709/238
6,795,450 B1 9/2004 Mills et al.
(Continued)

FOREIGN PATENT DOCUMENTS

EP 1484876 12/2004
GB 2337672 11/1999
GB 2337672 A * 11/1999

OTHER PUBLICATIONS

European Search Report corresponding to European Patent Application No. 08021185.7-2416, dated Mar. 30, 2009.

(Continued)

*Primary Examiner* — Mark Rinehart
*Assistant Examiner* — Matthew Hopkins
(74) *Attorney, Agent, or Firm* — Farjami & Farjami LLP

(57) ABSTRACT

An Ethernet network may comprise multi-rate link partners that may be coupled via an Ethernet link. The Ethernet link may comprise a plurality of channels wherein one or more may be silent and/or idle channels set to a low(er) power that may enable energy efficiency. Silent channels may be utilized for transmitting signals comprising one or more distinct physical patterns for controlling data rate transitions. For example, symbols may be utilized for generating the distinct physical patterns. The distinct physical patterns may communicate a new data rate, when to transition the data rate, which channel(s) may bear the data rate transition and/or a method for implementing the data rate transition. The method may comprise activating or suspending a data traffic channel, modifying a signal constellation, modifying PAM levels and/or adjusting inter-frame gap. The new data rate may be determined based on past traffic and/or expected traffic on the network link.

18 Claims, 6 Drawing Sheets

(56) References Cited

U.S. PATENT DOCUMENTS

| | | |
|---|---|---|
| 2006/0034295 A1* | 2/2006 | Cherukuri et al. ....... 370/395.52 |
| 2006/0221831 A1 | 10/2006 | Wadekar et al. |
| 2007/0280239 A1 | 12/2007 | Lund |
| 2008/0225881 A1* | 9/2008 | Powell .......................... 370/463 |
| 2009/0097389 A1* | 4/2009 | Diab et al. .................... 370/201 |
| 2009/0097391 A1* | 4/2009 | Diab et al. .................... 370/201 |
| 2009/0125735 A1* | 5/2009 | Zimmerman ................. 713/310 |

OTHER PUBLICATIONS

Bennett et al., "Energy Efficient Ethernet." Retrieved from the Internet on Dec. 15, 2008: http://www.iee802.org/802_tutorials/july07/IEEE-tutorial-energy-efficient-ethernet.pdf.

Jones, et al., *A Survey of Energy Efficient Network Protocols for Wireless Networks*, 2001, Wireless Networks, vol. 7, p. 343-358.

\* cited by examiner

METHOD AND SYSTEM FOR INDICATING A TRANSITION IN RATE AND/OR POWER CONSUMPTION UTILIZING A DISTINCT PHYSICAL PATTERN ON ONE OR MORE IDLE CHANNEL(S)

CROSS-REFERENCE TO RELATED APPLICATIONS/INCORPORATION BY REFERENCE

The present application is a continuation-in-part of application Ser. No. 11/859,429, filed on Sep. 21, 2007, which claims priority to provisional application No. 60/894,240, filed on Mar. 12, 2007 and provisional application 60/917,870, filed on May 14, 2007.

This application makes reference to and claims priority to U.S. Provisional Application Ser. No. 61/014,227 filed on Dec. 17, 2007, entitled "method and system for indicating a transition in data rate and/or power consumption utilizing a distinct physical pattern on idle channel(s) of a subset PHY".

This application makes reference to and claims priority to U.S. Provisional Application Ser. No. 61/094,639 filed on Sep. 5, 2008, entitled "method and system for indicating a transition in data rate and/or power consumption utilizing a distinct physical pattern on one or more idle channel(s)".

This patent application also makes reference to:
U.S. patent application Ser. No. 12/042,139 which was filed on Mar. 4, 2008;
U.S. patent application Ser. No. 12/049,000 which was filed on Mar. 14, 2008;
U.S. patent application Ser. No. 12/235,345 filed on even date herewith;
U.S. patent application Ser. No. 12/235,368 filed on even date herewith;
U.S. patent application Ser. No. 12/235,391 filed on even date herewith; and
U.S. patent application Ser. No. 12/235,506 filed on even date herewith.

Each of the above state applications is hereby incorporated herein by reference in its entirety.

FIELD OF THE INVENTION

Certain embodiments of the invention relate to networking. More specifically, certain embodiments of the invention relate to a method and system for indicating a transition in rate and/or power consumption utilizing a distinct physical pattern on one or more idle channel(s).

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular.

These recent developments have led to increased demand on datacenters, aggregation, high performance computing (HPC) and core networking. As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for indicating a transition in rate and/or power consumption utilizing a distinct physical pattern on one or more idle channel(s), substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in method and system for indicating a transition in rate and/or power consumption utilizing a distinct physical pattern on one or more idle channel(s). In this manner an Ethernet network may comprise multi-rate link partners that may be coupled via an Ethernet link wherein the Ethernet link may comprise a plurality of channels. When data packet traffic may be suspended, one or more of the plurality of channels may be silent and/or set to a low(er) power idle mode. U.S. patent application Ser. No. 11/859,385 discloses an exemplary low power idle mode and is hereby incorporated herein by reference in its entirety. However, the one or more silent channels may be utilized for transmission of control signals comprising one or more distinct physical patterns for controlling a data rate transition on the Ethernet link.

In addition, the one or more silent channels may be utilized for transmission of one or more distinct physical patterns. Moreover, the one or more distinct physical patterns may communicate, for example, a data rate to be utilized after the data rate transition, when the data rate transition may occur, which of the plurality of channels may bear the data rate transition and/or a method for implementing the data rate transition. For example, a method for implementing the data rate transition may comprise activating a data traffic channel or suspending data traffic by placing a channel in silent or idle mode. Moreover a method for implementing the data rate transition may comprise one or more of modifying a signal constellation on an active channel, modifying pulse amplitude modulation levels and adjusting an inter-frame gap for example. The data rate to be utilized after the data rate transition may be determined based on past traffic and/or expected traffic on the network link. These methods may also be utilized for controlling data rate transitions over a media dependent interface or a MAC/PHY interface. Implementing data rate transitions based on levels of past or expected data traffic may enable more energy efficient communications via Ethernet systems.

Figure 1:
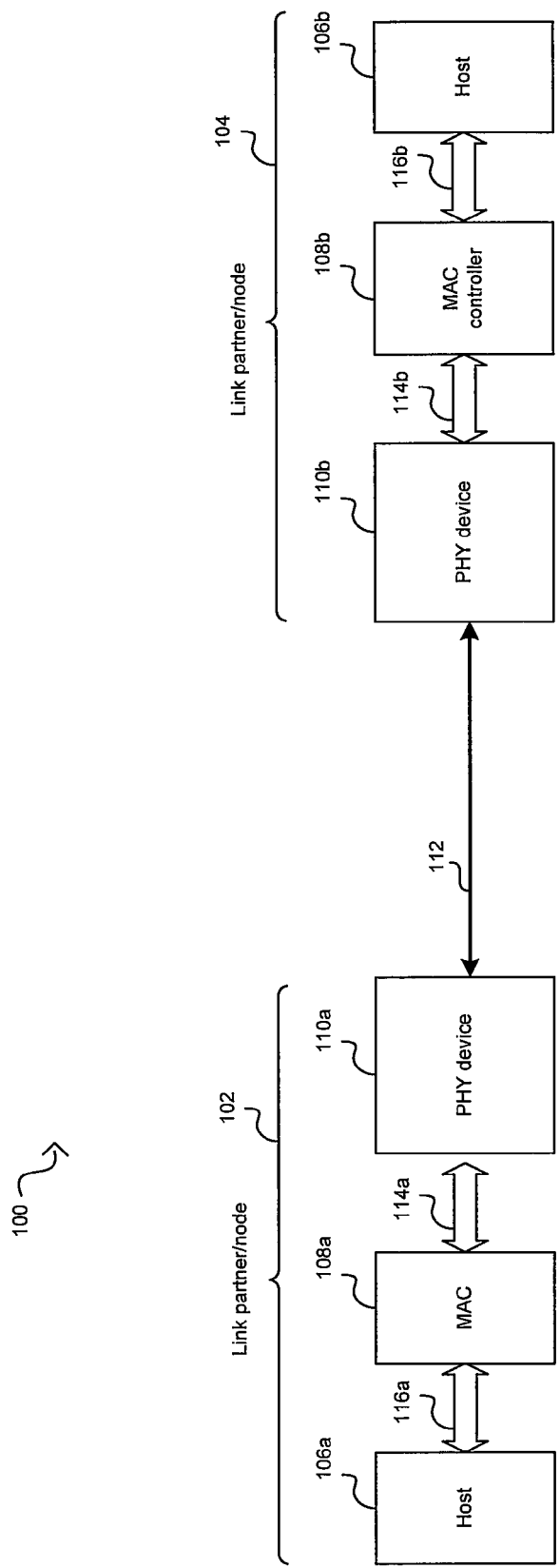
FIG. 1 is a block diagram illustrating an exemplary Ethernet connection between two link partners, in accordance with an embodiment of the invention.

FIG. 1 is a block diagram illustrating an exemplary Ethernet connection between two link partners, in accordance with an embodiment of the invention. Referring to FIG. 1, there is shown a system 100 that comprises a node 102, a node 104 and an Ethernet link 112.

The node 102 and the node 104 may communicate via the Ethernet link 112. The Ethernet link 112 is not limited to any specific medium and may utilize any suitable medium. Exemplary Ethernet link 112 media may comprise copper, optical and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon and backplane may be utilized. With regard to optical media for the Ethernet link 112, single mode fiber as well as multi-mode fiber may be utilized.

In an exemplary embodiment of the invention, the link 112 may comprise up to four or more physical channels, each of which may comprise, for example, an unshielded twisted pair (UTP). The node 102 and the node 104 may communicate via two or more physical channels in the link 112. For example, Ethernet over twisted pair standards 10BASE-T and 100BASE-TX may utilize two pairs of UTP while Ethernet over twisted pair standards 1000BASE-T and 10 GBASE-T may utilize four pairs of UTP. In this regard, aspects of the invention may enable varying the number of physical channels via which data may be communicated.

In an exemplary embodiment of the invention, the link partners, node 102 and node 104, may comprise a twisted pair PHY capable of operating at one or more standard rates such as 10 Mbps, 100 Mbps, 1 Gbps, and 10 Gbps (10BASE-T, 100 GBASE-TX, 1 GBASE-T, and/or 10 GBASE-T); potentially standardized rates such as 40 Gbps and 100 Gbps; and/or non-standard rates such as 2.5 Gbps and 5 Gbps.

In an exemplary embodiment of the invention, the link partners, node 102 and/or node 104, may comprise a backplane PHY capable of operating at one or more standard rates such as 10 Gbps (10 GBASE-KX4 and/or 10 GBASE-KR); and/or non-standard rates such as 2.5 Gbps and 5 Gbps.

In an exemplary embodiment of the invention, the link partners, node 102 and/or node 104, may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the link partners, node 102 and/or 104 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Other technologies, for example, single channel, two channel or four channels may also be supported. More over, TDM technologies such as PON at various speeds may be supported by the link partner nodes 102 and/or 104.

The node 102 may comprise a host 106a, a medium access control (MAC) controller 108a, and a PHY device 104a. The node 104 may comprise a host 106b, a MAC controller 108b, and a PHY device 110b. Notwithstanding, the invention is not limited in this regard. In various embodiments of the invention, the node 102 and/or node 104 may comprise, for example, computer systems or audio/video (A/V) enabled equipment. In this regard, A/V equipment may, for example, comprise a microphone, an instrument, a sound board, a sound card, a video camera, a media player, a graphics card, or other audio and/or video device. Additionally, the node 102 and node 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the node 102 and the node 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the node 102 and the node 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable communication of data between the node 102 and the node 104 at symmetric data rates. For example, transmission and reception of data may occur at the same rate in both directions between the link partners node 102 and node 104B. In other exemplary embodiments of the invention, data may travel at asymmetrical data rates. For example, data may be communicated at different rates for different directions. As such, a node may utilize a first data rate for transmission and a second data rate for reception. In this manner, an exemplary embodiment of the invention may comprise a multimedia server as node 102 and may comprise a multimedia client as node 104. The node 102 may transmit multimedia data, for example, to the node 104 at high(er) data rates while the node 104 may transmit control or auxiliary data associated with the multimedia content at low(er) data rates.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. Exemplary MIIs may comprise gigabit MII (GMII), 10 Gigabit MII (XGMII), Serial Gigabit MII (SGMII), and Reduced Gigabit MII (RGMII).

In an exemplary embodiment of the invention illustrated in FIG. 1, the hosts 106a and 106b may represent layer 2 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the link 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the link 112 and/or to decode data packets received from the link 112. Moreover, control characters may be generated by a sub-layer within the physical layer, for example, the physical coding sub-layer (PCS) in a 10 GBASE-T system. These control characters, also known as special symbols, may be transmitted on silent or idle channels that are not actively carrying data packets or on active channels. For example, IDLE symbols may be periodically transmitted via silent channels.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the link partner node 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multirate capable interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of physical channels at a fixed data rate which may result in network links being underutilized and transmitting IDLE symbols for significant portions of time. In this regard, when the link partners node 102 and node 104 first establish a connection, they may exchange some preliminary information and/or training signals. The link partners 102 and 104 may negotiate a data rate (e.g., 10 Gbps) and simplex or duplex mode (e.g., full-duplex) for communicating with each other. Additionally, in order to establish reliable communications, each of the link partners node 102 and node 104 may need to adjust various parameters, and/or circuitry to account for variables such as the type of cabling over which data may be communicated and the environmental conditions (e.g. temperature) surrounding the cabling. Once the link partners are "trained", they may initially transmit data at a first data rate such as 10 Gbps for example. In this regard, conventional PHY devices may distribute traffic evenly over all available physical channels and may continuously transmit IDLE symbols between packets of actual data.

In various embodiments of the invention, based upon a varying demand for transmitting data traffic, it may be determined that a data rate may be higher or lower than necessary or desired. For example, based on link utilization, past or present traffic statistics, and/or available resources (e.g., power, buffer space, processor time, etc.), it may be determined that a data rate on the link 112 may be higher or lower than necessary or desired. Accordingly, reducing or increasing the data rate of the connection between the link partners 102 and 104 may enable the link partners 102 and 104 to communicate in a more energy efficient or effective manner. For example, the data rate may be increased or decreased by increasing or decreasing a number of physical channels utilized to communicate data packets. In addition, the data rate may be controlled by controlling the pulse amplitude modulation (PAM) levels used for signaling, controlling the signal constellation utilized for representing data on the link, and/or controlling the length of time between frames (the inter-frame gap) for example. Information for controlling or managing data rate changes may be conveyed by signals transmitted via silent or idle channels within the link 112 by the PHY 110a and/or 110b wherein the signals may comprise one or more distinct physical patterns.

The one or more distinct physical patterns sent via silent or idle channels may comprise information regarding the rate transitions. For example, one or more distinct physical patterns may indicate which data rate to transition to, may indicate when a rate transition may occur and/or how a rate transition may occur such as adding or decreasing the number of active channels and/or modifying a signal constellation. In this regard, the physical signaling for going up in rate, down in rate and/or to various rates, may or may not utilize the same code sequences. In addition, the PHY devices 110a and 110b may be configured to adjust rate at the beginning of a full packet versus, for example, a refresh cycle. These methods may be utilized with active channel methods and/or higher layer packet protocols for example, Ethernet frames and/or IP frames. Also, additional methods may utilize refresh patterns on idle channels.

In various embodiments of the invention, one or more policies and/or protocols may be implemented by the link partners 102 and 104 in order to improve energy efficiency. Accordingly, the link partners node 102 and 104 may each comprise an energy efficient network (EEN) control entity which may comprise suitable logic, circuitry, and/or code for implementing the energy efficient networking policies and/or protocols. In order to implement these EEN protocols and/or policies, the link partners node 102 and 104 may need to exchange control and/or management traffic. For example, control and/or management traffic may be utilized to communicate link state information, negotiate data rates on the link 112, indicate that a data rate change may be desired or necessary, and/or schedule one or more data rate transition. Accordingly, aspects of the invention may enable utilizing a silent or idle channel to convey distinct physical patterns for exchanging control policy and/or management information.

In various embodiments of the invention, when the link partners node 102 and/or node 104 first start-up or upon establishing a connection or data rate transition, they may exchange some preliminary information via the PHY devices 110a and 110b and may train or adapt to current link conditions such that reliable communications may be established on the link 112. The training may comprise configuring various parameters, circuitry, and or timing loops in one or both of the nodes 102 and 104 such that the nodes may be synchronized and/or reliably communicate over one or more physical channels of the link 112. In this manner, reliable operation of functions such as echo cancellation, far-end crosstalk cancellation, and near-end crosstalk cancellation may be enabled.

Figure 2:
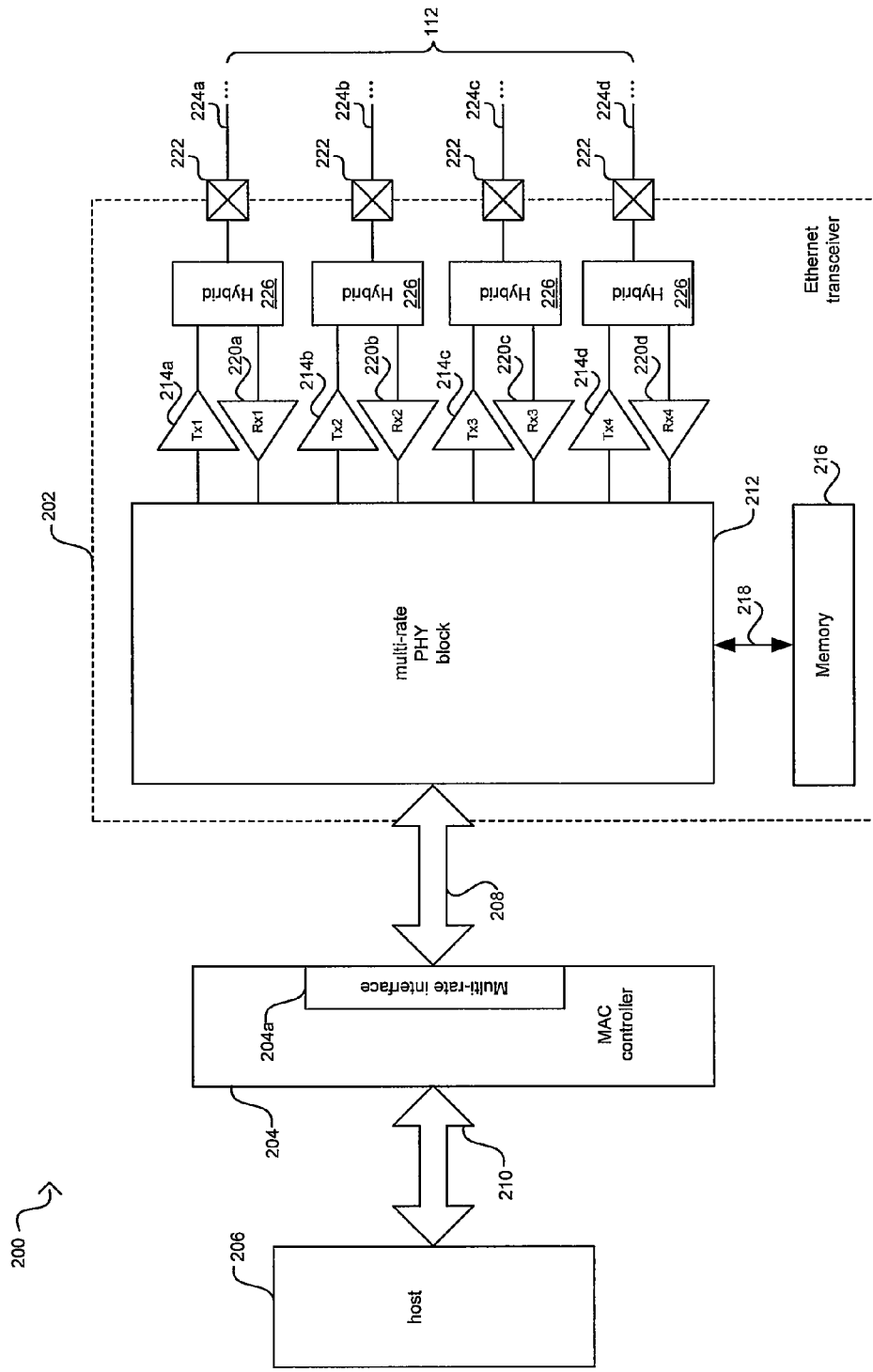
FIG. 2 is a block diagram illustrating an exemplary Ethernet over twisted pair PHY device architecture comprising a multi-rate capable physical block, in accordance with an embodiment of the invention.

FIG. 2 is a block diagram illustrating an exemplary Ethernet over twisted pair PHY device architecture comprising a multi-rate capable physical block, in accordance with an embodiment of the invention. Referring to FIG. 2, there is shown a link partner node 200 which may comprises an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that comprises a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate capable interface 204a that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating the appropriate link discovery signaling utilized for establishing communication with a remote PHY device in a remote link partner. The multi-rate capable physical layer block 212 may communicate with the MAC controller 204 via the interface 208. In one aspect of the invention, the interface 208 may be a media independent interface (MII) and may be configured to utilize a plurality of serial data lanes for receiving data from the multi-rate capable physical layer block 212 and/or for transmitting data to the multi-rate capable physical layer block 212. The multi-rate capable physical layer block 212 may be configured to operate in one or more of a plurality of communication modes, where each communication mode may implement a different communication protocol. These communication modes may include, but are not limited to, Ethernet over twisted pair standards 10BASE-T, 100BASE-TX, 1000BASE-T, 10 GBASE-T, and other similar protocols that utilize multiple physical channels between link partners. The multi-rate capable physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214a, 214b, 214c, 214d may comprise suitable logic, circuitry, and/or code that may enable transmission of data from the link partner 200 to a remote link partner via, for example, the link 112 in FIG. 1. The receivers 220a, 220b, 220c, 220d may comprise suitable logic, circuitry, and/or code that may enable receiving data from a remote link partner. Each of the transmitters 214a, 214b, 214c, 214d and receivers 220a, 220b, 220c, 220d in the PHY device 202 may correspond to a physical channel of the link 112. In this manner, a transmitter/receiver pair may interface with each of the physical channels 224a, 224b, 224c, and/or 224d. In this regard, the transmitter/receiver pairs may be enabled to provide the appropriate communication rate and mode for each physical channel.

The input/output interfaces 222 may comprise suitable logic circuitry, and/or code that may enable the PHY device 202 to impress signal information onto a physical channel, for example a twisted pair of the link 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the link partner node 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancellers, far-end crosstalk (FEXT) cancellers, and/or near-end cross (NEXT) cancellers. Each hybrid 226 in the link partner node 200 may be communicatively coupled to an input/output interface 222.

In various embodiments of the invention, the link partner node 200 may suspend data traffic on one or more of the physical channels 224, for example, when those one or more physical channels are not required to meet current and/or future demand of the link. In this manner, transmitters 214, receivers 220, hybrids 226, and/or portions of the multi-rate capable physical layer block 212 corresponding with the unused physical channels may be silent or idle with regard to supporting data packet traffic and may be set to a low(er) power idle state. These silent or idle channels may, however, be utilized to convey control and/or management information via one or more signals comprising distinct physical patterns. For example, control information may enable transitioning of data rates and/or power states for data traffic communicated via one or more active channels on the link 112. The one or more distinct physical patterns sent via silent or idle channels may comprise information regarding the rate transitions. For example, a new data rate, when a rate transition may occur and/or how a rate transition may occur such as adding or decreasing the number of active channels and/or modifying a signal constellation may be indicated based on the distinct physical patterns.

In various embodiments of the invention, when the node 200 may first start-up or upon establishing a connection or transitioning a data rate, it may exchange some preliminary information with a remote link partner and may train or adapt to current link conditions such that reliable communications may be established on the link 112. The training may comprise configuring various parameters, circuitry, and or timing loops such that the node 200 and the remote link partner may be synchronized and/or reliably communicate over one or more physical channels of the link 112. In this manner, reliable operation of functions such as echo cancellation, far-end crosstalk cancellation, and near-end crosstalk cancellation may be enabled.

Figure 3:
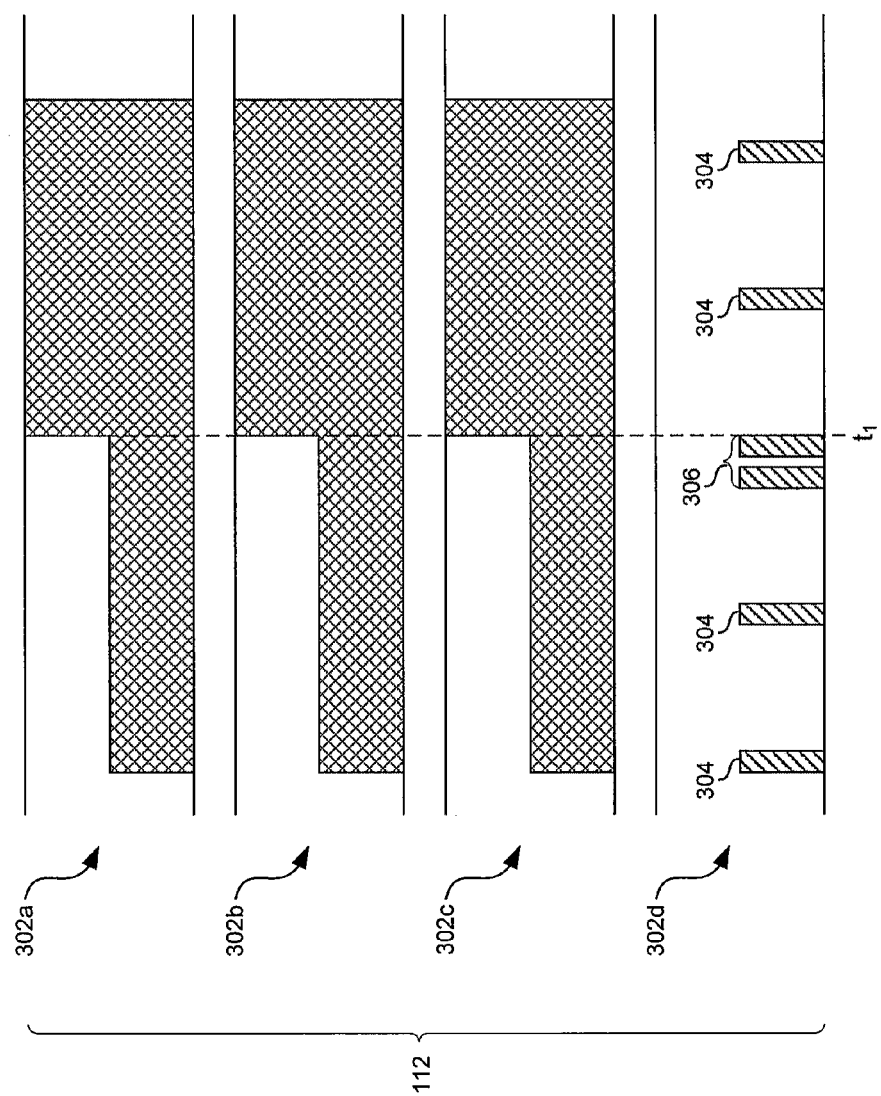
FIG. 3 is a diagram illustrating an exemplary data rate transition activated by a transmitted signal comprising a distinct physical pattern, in accordance with an embodiment of the invention.

FIG. 3 is a diagram illustrating an exemplary data rate transition activated by a transmitted signal comprising a distinct physical pattern, in accordance with an embodiment of the invention. Referring to FIG. 3 the link 112 may comprise four channels 302a, 302b, 302c and 302d.

The link 112 may be similar or substantially the same as the link 112 disclosed in FIG. 1 and in FIG. 2. In addition, the four channels 302a, 302b, 302c and 302d may be similar or substantially the same as the channels 224a, 224b, 224c and 224d disclosed in FIG. 2.

In operation, one or more channels 302 on the link 112 may be silent or set to a low(er) power idle state wherein the one or more silent channels may not be utilized for conveying data packets. The one or more silent channels, for example, the channel 302d may however, convey signals utilized for control and/or management information. The control and/or management signals may be transmitted by the PHY 110a, PHY 110b and/or PHY 200. In this regard, the channel 302 may be utilized to periodically convey IDLE symbols 304 and/or signals comprising distinct physical patterns 306. The IDLE symbols 304 may be utilized to maintain synchronization between link partners. In this regard, conventional systems may utilize IDLE symbols as defined in the 802.3 standards. However, aspects of the invention may enable altering and/or replacing one or more of the IDLE symbols 304 to transmit one or more distinct physical patterns to coordinate a data rate transition. Moreover, utilization and/or demand for transmitting data traffic via the link 112 may be at a level below the maximum data rate supported by the link 112. Accordingly, one or more channels of the link 112 may be carrying traffic at an intermediate rate. At some point in time, however, demand and/or utilization of the link 112 may increase and thus a data rate of the link 112 may need to be increased accordingly. In this regard, the data rate of the link 112 may be increased by speeding up one or more of the active channels (if they are not already operating at a maximum data rate) or by making active ("awakening") one or more of the silent channels. Accordingly, a distinct physical pattern that may differ from an idle symbol or signal may be sent via one or more of the silent channels and may provide information regarding the data rate increase. For example, the distinct physical pattern that may differ from an idle symbol or signal may indicate which data rate to transition to, when the transition may occur and/or how the rate transition may occur such as modifying a signal constellation or reducing inter-frame gap for example.

In various embodiments of the invention the distinct physical pattern may be communicated utilizing one or more discrete voltage and/or power levels communicated over the channel(s). In various embodiments of the invention, the discrete levels that are transmitted and/or the sequence in which the levels are transmitted may correspond to control information for a data rate transition. In some instances, a portion of the sequence may correspond to a preamble which may be operable to alert a receiver that data rate transition information is forthcoming. In some instances, the data rate transition information may be packetized and may comprise for example, a header, a payload, and/or a CRC. In various embodiments of the invention, the distinct pattern may be encoded utilizing, for example, LDPC encoding in order to enable error correction at the receiver.

Referring to FIG. 3, prior to time instant t1, the channels 302a, 302b, and 302c may be transmitting data at less than the maximum data rate for each channel. Furthermore, the channel 302d may be silent and transmitting only periodic IDLE symbols. However, just prior to time instant t1, it may be determined, for example, by the node 102 and/or 104 that demand and/or utilization of the link 112 may be increasing, for example, an additional multimedia stream may soon reach the link 112. Accordingly, a distinct pattern 306 may be transmitted via the channel 302d to indicate an increase in data rate. Subsequent to the unique physical symbol 306, at time instant t1, the channels 302a, 302b, and 302c may transition to a full data rate. For example, the data rate may be increase by increasing PAM levels, increasing the signal constellation utilized for representing data on the link and/or controlling the length of time between frames (the inter-frame gap).

Figure 4:
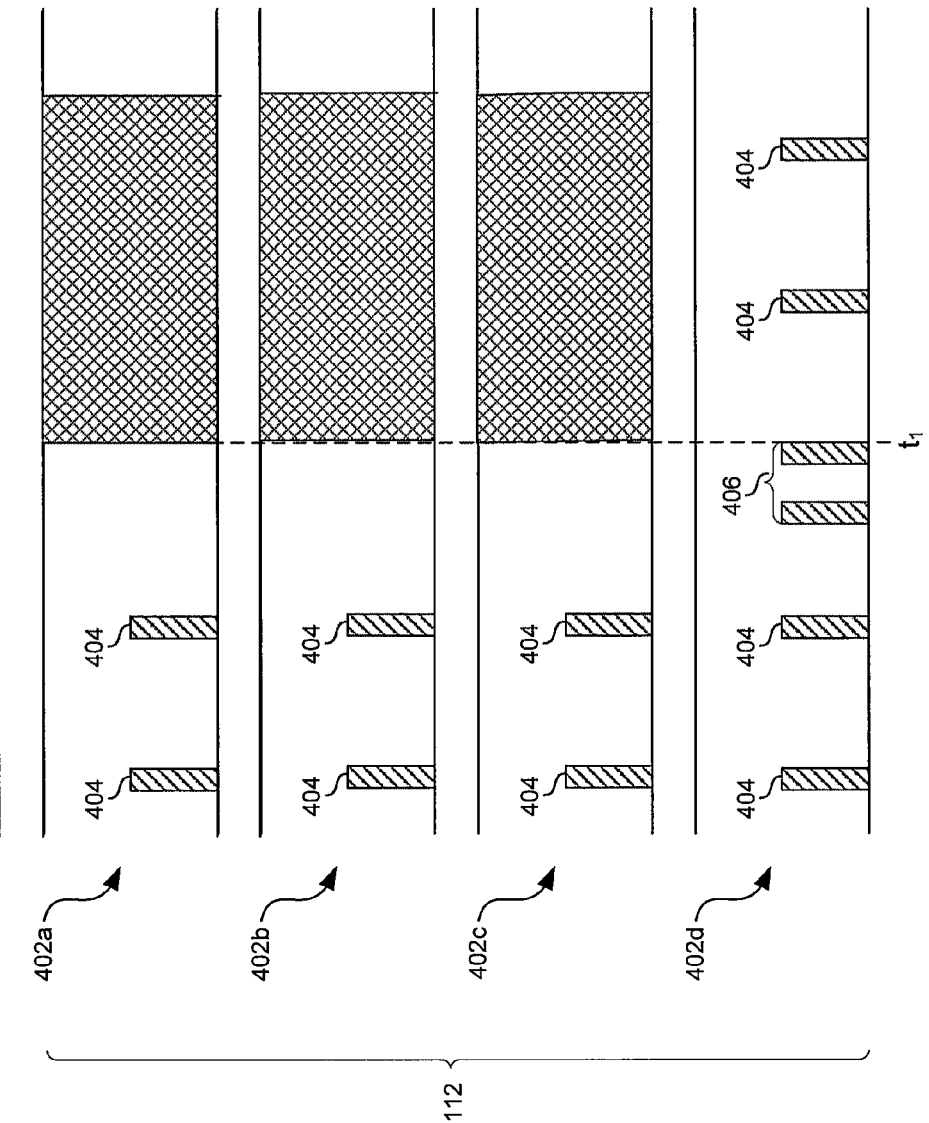
FIG. 4 is a diagram illustrating an exemplary data rate transition activated by a transmitted signal comprising a distinct physical pattern, in accordance with an embodiment of the invention.

FIG. 4 is a diagram illustrating an exemplary data rate transition activated by a transmitted signal comprising a distinct physical pattern, in accordance with an embodiment of the invention. Referring to FIG. 4 the link 112 may comprise four channels 402a, 402b, 402c and 402d.

The link 112 may be similar or substantially the same as the link 112 disclosed in FIG. 1 and in FIG. 2. In addition, the four channels 402a, 402b, 402c and 402d may be similar or substantially the same as the channels 224a, 224b, 224c and 224d disclosed in FIG. 2.

In operation, the channels 402a, 402b, 402c and/or 402d may be silent with regard to data packet traffic but may convey signals utilized for control and/or management information. For example, the channels 402a, 402b, 402c and/or 402d may convey periodic IDLE symbols 404. However, utilization and/or demand for transmitting data traffic via the link 112 may increase and thus a data rate for the link 112 may need to be established accordingly. In this regard, node 102 and/or node 104 may activate one or more of the silent channels 402a, 402b, 402c and 402d. Accordingly, the new data rate for the link 112 may be indicated by a signal comprising a distinct physical pattern sent between the nodes 102 and 104 via one or more of the silent channels 402a, 402b, 402c and 402d. The distinct physical pattern may indicate, for example, which data rate to transition to, when to transition the data rate and/or how to transition the data rate such as activating silent channels with a specified signal constellation, for example.

Referring to FIG. 4, prior to time instant t1, the channels 402a, 402b, 402c and 402d may be silent with regard to packet data transmissions. Furthermore, the channels 402a, 402b, 402c and 402d may be conveying only periodic IDLE symbols. However, just prior to time instant t1, it may be determined, for example, by the node 102 and/or 104 that demand and/or utilization of the link 112 may be increasing, for example, a multimedia stream may soon reach the link 112. Accordingly, a distinct pattern 406 may be transmitted via the channel 402d to indicate a transition from a data rate of zero to data transmission at a full rate. Subsequent to the unique physical symbol 406, at time instant t1, the channels 402a, 402b, and 402c may transition from an idle or silent mode active an may begin transmitting data at the full rate.

Figure 5:
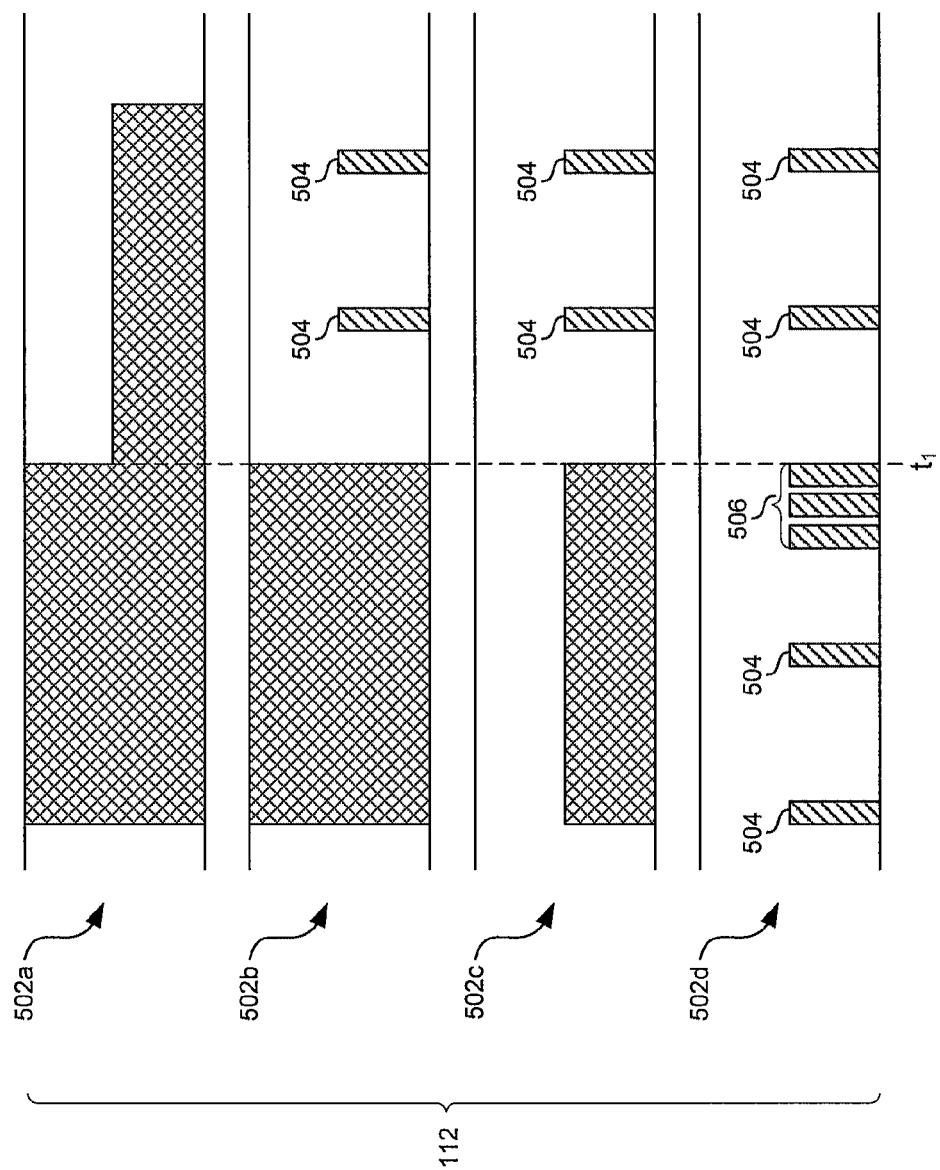
FIG. 5 is a diagram illustrating an exemplary data rate transition activated by a transmitted signal comprising a distinct physical pattern, in accordance with an embodiment of the invention.

FIG. 5 is a diagram illustrating an exemplary data rate transition activated by a transmitted signal comprising a distinct physical pattern, in accordance with an embodiment of the invention. Referring to FIG. 5 the link 112 may comprise four channels 502a, 502b, 502c and 502d.

The link 112 may be similar or substantially the same as the link 112 disclosed in FIG. 1 and in FIG. 2. In addition, the four channels 502a, 502b, 502c and 502d may be similar or substantially the same as the channels 224a, 224b, 224c and 224d disclosed in FIG. 2.

In operation, the channels 502d may be silent with regard to data packet traffic but may convey signals utilized for control and/or management information. For example, the channels 502d may convey periodic IDLE symbols 504. The channels 502a, 502b and 502c may carry data packet traffic at one or more rates per channel. However, utilization and/or demand for transmitting data traffic via the link 112 may decrease and the data rate may need to be modified accordingly. In this regard, node 102 and/or node 104 may lower a data rate and/or may suspend data traffic on one or more channels 502a, 502b, 502c and 502d. Accordingly, a signal comprising a distinct physical pattern sent between the nodes 102 and 104 via the silent channel 502d may provide information regarding the rate decrease, for example, which data rate to transition to, when the rate transition may occur and/or how the rate transition may occur such as decreasing the number of active channels and/or modifying a signal constellation for example.

Referring to FIG. 5, prior to time instant t1, the channel 502d may be silent with regard to packet data transmissions and may convey only periodic IDLE symbols for example. Just prior to time instant t1, it may be determined, for example, by the node 102 and/or 104 that demand and/or utilization of the link 112 may be decreasing, for example, transmission of a multimedia stream may have finished. Accordingly, a distinct pattern 506 may be transmitted via the silent channel 502d to indicate a transition from a first data rate to a second data rate. Subsequent to the unique physical symbol 506, at time instant t1, the channel 502a may transition from a full data rate to an intermediate data rate. In this regard, the signal constellation may be reduced to lower the data rate on channel 502a. In addition, at time instant t1, channels 502b and 502c may transition from a full data rate and an intermediate data rate, respectively, to a zero data rate or a silent mode. For example, data packet traffic via the channels 502b and 502c may be suspended. Moreover, at time instant t1, channels 502b and 502c may begin to convey periodic IDLE symbols 506 between the nodes 102 and 104, for example.

In instances when four channels are carrying data at full rate and the link partners 102 and/or 104 may determine that the data rate on one or more channels may be reduced to a lower or zero rate, other types of signaling may be utilized to convey data rate control information. For example, out-of-band (OOB) signaling or higher layer packets may convey information regarding data rate changes between the link partners 102 and 104. This may be possible because when a system determines that it may lower its data rate, it may have more bandwidth than needed for data awaiting transmission. For example, when all four channels are active, a link partner 102 and/or 104 may send signaling via IDLE packets on an active channel. In various embodiments of the invention, transitioning from a higher data rate to a lower data rate may not need to happen as quickly as transitioning from a lower data rate to a higher data rate. This is because latency may not be affected when a system may be enabled to reduce data rate. Notwithstanding, a slower transition from a higher data rate to a lower data rate may reduce energy efficiency.

Figure 6:
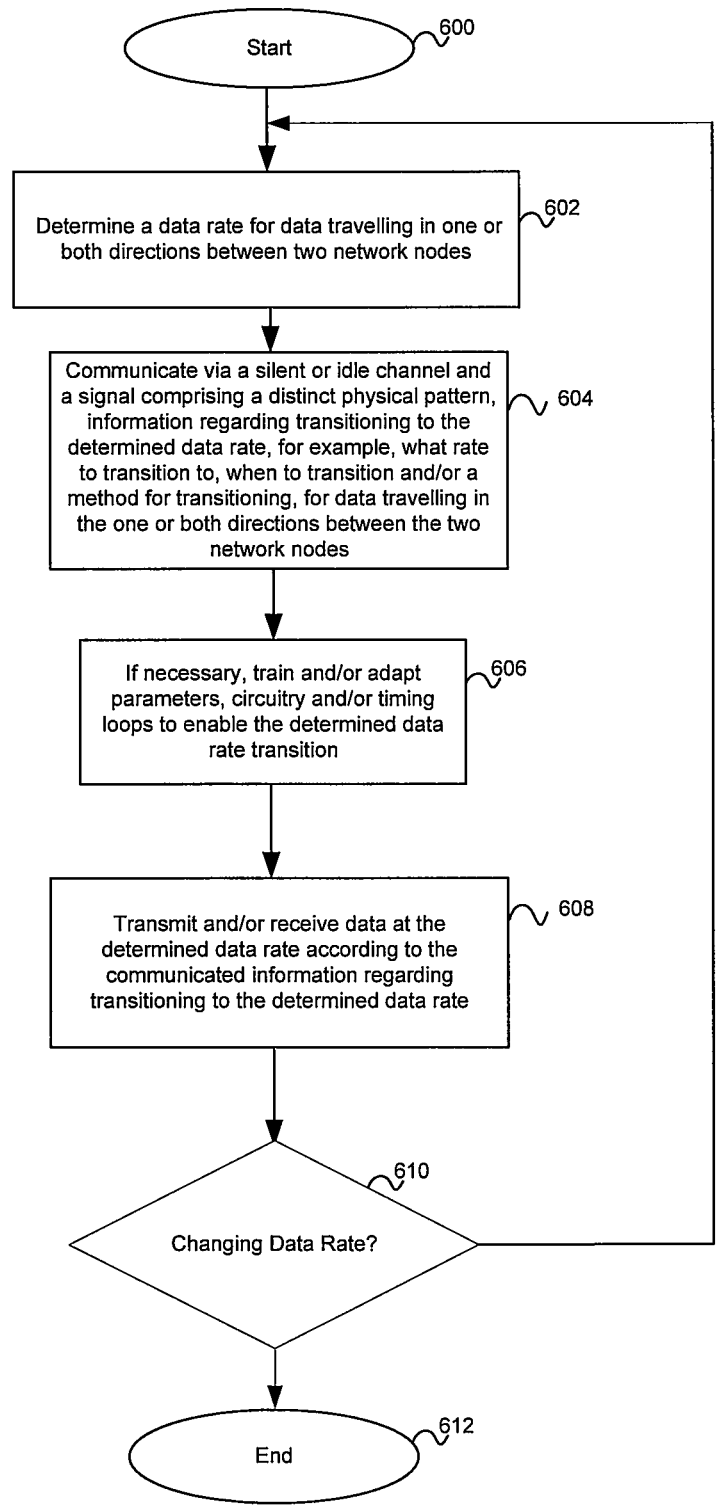
FIG. 6 is a flow chart illustrating exemplary steps for implementing a change in data rate via one or more distinct physical patterns on an idle channel, in accordance with an embodiment of the invention.

FIG. 6 is a flow chart illustrating exemplary steps for implementing a change in data rate via one or more distinct physical patterns on an idle channel, in accordance with an embodiment of the invention. Referring to FIG. 6, after start step 600, in step 602, a data rate may be determined for data travelling in one or both directions between two network nodes 102 and 104. In step 404, a signal comprising a distinct physical pattern sent via a silent or idle channel such as a channel 224, may communicate information regarding a transition to the determined data rate. For example, the distinct physical pattern may indicate what rate to transition to, when to transition and/or a method for transitioning, for data travelling in the one or both directions between the two network nodes 102 and 104. In step 606, if necessary, parameters, circuitry and/or timing loops for enabling the determined data rate transition among the nodes 102 and/or 104 may be trained and/or adapted. In step 608, the nodes 102 and/or 104 may transmit and/or receive data at the determined data rate according to the communicated information regarding transitioning to the new data rate. In step 610, in instances when a data rate may continue without change, proceed to step 610. Step 610 may be an end of exemplary steps. In step 610, in instances when a data rate may change, proceed to step 602.

In an embodiment of the invention, an Ethernet network such as system 100 shown in FIG. 1, may comprise multi-rate link partners, node 102 and node 104, that may be coupled via an Ethernet link 112 comprising a plurality of channels 224a, 224b, 224c and/or 224d, for example. The plurality of channels may comprise one or more silent channels such as the silent channels 302d, 402d and/or 502d that may be utilized for transmission of one or more distinct physical patterns such as 306, 406 and/or 506 that may control a data rate transition on the Ethernet link. In this regard, the one or more silent channels such as silent channels 302d, 402d and/or 502d may not transmit data packets. However, the one or more silent channels 302d, 402d and/or 502d may be utilized for transmission of one or more IDLE symbols such as the IDLE symbols 304, 404 and/or 504. Moreover, generation of the one or more distinct physical patterns such as 306, 406 and/or 506 may be based on one or more IDLE symbols such as 304, 404 and/or 504. In this manner, the one or more distinct physical patterns 306, 406 and/or 506 may communicate, for example, a data rate to be utilized after the data rate transition, when the data rate transition may occur and/or a method for implementing the data rate transition such as activating or suspending data traffic on a channel or modifying signal constellation on an active channel, for example. In addition, the one or more distinct physical patterns 306, 406 and/or 506 may communicate which of the plurality of channels 224a, 224b, 224c and/or 224d may bear the data rate transition. The data rate to be utilized after the data rate transition, for example, after time instant t1 in FIGS. 3, 4 and 5, may be determined based on past traffic on the network link 112 and/or based on expected traffic on the network link 112.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for indicating a transition in rate and/or power consumption utilizing a distinct physical pattern on one or more idle channel(s).

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking to provide reliable data communications over one or more channels, said method comprising:
   in an Ethernet network comprising multi-rate link partners coupled via an Ethernet link comprising one or more active channels and one or more silent channels, performing by one of said multi-rate link partners subsequent to initialization of said Ethernet link:
      determining one or more data rate transitions for said one or more active channels;
      transmitting one or more distinct physical patterns of IDLE symbols for controlling said one or more data rate transitions for said one or more active channels via said one or more silent channels;
      wherein said one or more distinct patterns of IDLE symbols indicate a modification in one or more of signal constellation, pulse amplitude modulation levels, and a length of time between frames.

2. The method according to claim 1, wherein said multi-rate link partners refrain from transmitting data packets via said one or more silent channels.

3. The method according to claim 1, comprising communicating, via said one or more distinct physical patterns of IDLE symbols, one or more data rates to utilize after said one or more data rate transitions.

4. The method according to claim 3, wherein said one or more data rates communicated via said one or more distinct physical patterns of IDLE symbols are determined based on past traffic on said Ethernet link.

5. The method according to claim 3, wherein said one or more data rates communicated via said one or more distinct physical patterns of IDLE symbols are determined based on expected traffic on said Ethernet link.

6. The method according to claim 1, comprising indicating, via said one or more distinct physical patterns of IDLE symbols, when said one or more data rate transitions should occur on said one or more active channels.

7. The method according to claim 1, comprising indicating, via said one or more distinct physical patterns of IDLE symbols, a method to utilize for implementing said one or more data rate transitions.

8. The method according to claim 1, comprising indicating, via said one or more physical patterns of IDLE symbols, which of said one or more active channels will bear said one or more data rate transitions.

9. The method according to claim 1, comprising controlling said one or more data rate transitions for one or both of a media dependent interface and a MAC/PHY interface by transmitting said one or more distinct physical patterns of IDLE symbols via one or both of said media dependent interface and said MAC/PHY interface.

10. A system for networking, the system comprising:
one or more circuits in a multi-rate link partner coupled to an Ethernet link comprising one or more active channels and one or more silent channels, said one or more circuits configured to perform, subsequent to initialization of said Ethernet link:
determining one or more data rate transitions for said one or more active channels;
transmitting one or more distinct physical patterns of IDLE symbols for controlling said one or more data rate transitions for said one or more active channels via said one or more silent channels;
wherein said one or more distinct patterns of IDLE symbols indicate a modification in one or more of signal constellation, pulse amplitude modulation levels, and a length of time between frames.

11. The system according to claim 10, wherein said multi-rate link partner refrains from transmitting data packets via said one or more silent channels.

12. The system according to claim 10, wherein said one or more circuits are configured to determine, based on said one or more distinct physical patterns of IDLE symbols, one or more data rates to utilize after said one or more data rate transitions.

13. The system according to claim 12, wherein said one or more data rates communicated via said one or more distinct physical patterns of IDLE symbols are determined based on past traffic on said Ethernet link.

14. The system according to claim 12, wherein said one or more data rates communicated via said one or more distinct physical patterns of IDLE symbols are determined based on expected traffic on said Ethernet link.

15. The system according to claim 10, wherein said one or more circuits are configured to indicate, via said one or more distinct physical patterns of IDLE symbols, when said one or more data rate transitions should occur on said one or more active channels.

16. The system according to claim 10, wherein said one or more circuits are configured to indicate, via said one or more distinct physical patterns of IDLE symbols, a method to utilize for implementing said one or more data rate transitions.

17. The system according to claim 10, wherein said one or more circuits are configured to indicate, via said one or more distinct physical patterns of IDLE symbols, which of said one or more of said active channels will bear said one or more data rate transitions.

18. The system according to claim 10, wherein said one or more circuits are configured to control said one or more data rate transitions for one or both of a media dependent interface and a MAC/PHY interface by transmitting said one or more distinct physical patterns of IDLE symbols via one or both of said media dependent interface and said MAC/PHY interface.

* * * * *